United States Patent
Cooper

(10) Patent No.: US 6,377,110 B1
(45) Date of Patent: Apr. 23, 2002

(54) LOW-COST TEMPERATURE SENSOR PROVIDING RELATIVELY HIGH ACCURACY, A WIDE DYNAMIC RANGE AND HIGH LINEARITY

(75) Inventor: Frank G. Cooper, Dix Hills, NY (US)

(73) Assignee: Keystone Thermometrics, St. Marys, PA (US)

( * ) Notice: Subject to any disclaimer, the term of this patent is extended or adjusted under 35 U.S.C. 154(b) by 0 days.

(21) Appl. No.: 09/630,047

(22) Filed: Aug. 1, 2000

Related U.S. Application Data

(60) Provisional application No. 60/153,439, filed on Sep. 10, 1999.

(51) Int. Cl.[7] .............................................. H01L 35/00
(52) U.S. Cl. ......................... 327/513; 327/83; 327/362; 327/378; 257/470; 702/104
(58) Field of Search ................................. 327/512, 513, 327/83, 538, 560, 561, 362, 378; 374/132, 133, 178, 170, 172; 377/25, 49; 257/467, 470; 702/99, 104

(56) References Cited

U.S. PATENT DOCUMENTS

| | | | |
|---|---|---|---|
| 3,791,217 A | * 2/1974 | Stout et al. | 374/167 |
| 4,047,435 A | * 9/1977 | Keith | 374/178 |
| 4,121,461 A | 10/1978 | Butler et al. | |
| 4,651,292 A | 3/1987 | Jeenicke et al. | |
| 4,943,807 A | 7/1990 | Early et al. | 341/120 |
| 5,604,684 A | * 2/1997 | Juntumen | 702/104 |

FOREIGN PATENT DOCUMENTS

| | | |
|---|---|---|
| EP | 0 721 099 | 7/1996 |
| GB | 2 191 292 | 12/1987 |
| JP | 07-038345 | 2/1995 |
| WO | WO 96/09692 | 3/1996 |

OTHER PUBLICATIONS

LM34/LM34A,LM34C/LM34CA,LM34D Precision Fahrenheit Temperature Sensors, and LM35/LM35A, LM35C/LM35CA, LM35D Precision Centigrade Temperature Sensors, *1984 Linear Supplement Databook, National Semiconductor Corporation,* (©1984, National Semiconductor Corp.), pp. S8–1 through S8–9.

M. Holdaway, "A Sense of Purpose", *New Electronics,* (International Thomson Publishing, London) vol. 30, No. 21, Dec. 9, 1997, pps. 42–43.

* cited by examiner

Primary Examiner—Timothy P. Callahan
Assistant Examiner—Minh Nguyen
(74) Attorney, Agent, or Firm—Michaelson & Wallace; Peter L. Michaelson

(57) ABSTRACT

Apparatus, specifically a circuit (100, 200), for a highly accurate, low cost temperature sensor, particularly one using silicon thermometry and which can be implemented by an application specific integrated circuit, that also possesses a high degree of linearity and a wide dynamic range. The inventive circuit advantageously utilizes either a mixed-signal approach or a digital core and provides independent adjustment, through two point calibration, of slope and ambient output offset values, with a zero offset adjustment advantageously accomplished through use of a digital tear. Specifically, given the inherent linearity of silicon thermometry, zero offset and desired output voltage are set, independently of each other, at a first predefined ambient calibration temperature as effectively two separate offset values, while slope (span) is set at a second predefined calibration temperature (typically a full scale temperature) different from the first temperature.

14 Claims, 2 Drawing Sheets

US 6,377,110 B1

LOW-COST TEMPERATURE SENSOR PROVIDING RELATIVELY HIGH ACCURACY, A WIDE DYNAMIC RANGE AND HIGH LINEARITY

CLAIM TO PRIORITY

This application claims priority of my co-pending United States provisional application entitled "A LOW-COST TEMPERATURE SENSOR HAVING RELATIVELY HIGH ACCURACY AND LINEARITY", filed Sep. 10, 1999 and assigned Ser. No. 60/153,439.

BACKGROUND OF THE INVENTION

1. Field of the invention

This application relates to apparatus, specifically a circuit, for a highly accurate, low cost temperature sensor, particularly one using silicon thermometry and which can be implemented by an application specific integrated circuit, that also possesses a high degree of linearity and a wide dynamic range.

2. Description of the Prior Art

Accurate low-cost, linear thermometry is a recurring application that crosses a wide variety of technical disciplines. For several years, the LM-34 and LM-35 series of temperature sensors available from National Semiconductor Corporation of Santa Clara, Calif., have been predominantly used as sensing elements in temperature sensing devices designed for such applications. While these devices are relatively accurate, in some applications—particularly those intended for mass market applications, such as automobile systems, the cost of these sensors can be excessive.

Therefore, a need currently exists in the art, and has existed for some time, for a temperature sensor that is highly accurate, has a wide dynamic range, is highly linear, and which can serve as a pin-for-pin replacement for the LM-34 and LM-35 series of temperature sensors, but which provides equal or better performance than these existing sensors and, particularly advantageously, at a reduced cost.

SUMMARY OF THE INVENTION

Accordingly, my present invention advantageously overcomes the above-described deficiencies in the art through a temperature sensing circuit that employs silicon thermometry, i.e., use of a silicon diode junction to provide a highly linear temperature dependent voltage, along with subsequent signal processing stages, either mixed-mode or digital, that collectively implement, through two-point calibration, independent adjustment of slope (span or full scale) and output offsets. Zero offset adjustment is advantageously accomplished through use of a digital tear.

In both embodiments, given the inherent linearity of silicon thermometry, zero offset and desired output voltage are set, independently of each other, at a first predefined ambient calibration temperature as effectively two separate offset values, while slope (span) is set at a second predefined calibration temperature (typically a full scale temperature) different from the first temperature.

In a mixed-mode embodiment, an output voltage produced by a silicon diode junction, is additively combined, through a variable gain amplifier (VGA), to an output of a digital tear ambient temperature offset adjustment circuit that provides ambient temperature offset correction. An output of the VGA is routed both to an input of a zero crossing detector and to an input of an output amplifier. The zero crossing detector controls application of clock pulses to the offset circuit. The output amplifier additively combines the output of the VGA and an output of an ambient temperature output adjustment circuit, the latter producing in effect a second offset value, to produce an output temperature dependent voltage.

In use, the circuit is calibrated at a desired and predefined first ambient calibration temperature, the exact value not being critical, by setting the gain of the AGC to maximum and enabling the digital tear offset adjustment circuit to incrementally slew (tear) its output value until the output of the VGA is zero, at which point the zero offset value is set. Once this occurs, the ambient temperature output adjustment, i.e., the second offset, is set such that a desired voltage appears at the output of the circuit. Thereafter, at the second calibration temperature, the gain of the AGC is digitally programmed, through application of a controlled incrementing/decrementing digital value, to yield a desired output voltage at that particular temperature; hence, effecting slope (span) correction. By virtue of a highly linear temperature dependent characteristic of a silicon diode junction, essentially no linearity correction needs to be added to the circuit to achieve, across a wide operating range, operating linearity on the order of ±0.05 degree C and accuracy on the order of ±0.1 degree C.

The digital core embodiment implements the same functionality though in a digital, rather than mixed-mode domain. Here, the diode junction output voltage is converted to a digital value, then digitally processed to implement this functionality and finally converted back to an analog output voltage.

Advantageously, in accordance with a feature of my invention, the circuit enters a calibration mode, where gain and various offset values are digitally varied, and a programming mode where these values are subsequently programmed, into non-volatile memory in the circuit, in response to predefined states in the voltage levels applied to V+ (power) and output terminals; these states being detected by suitable control circuitry within the device. In particular, calibration and programming modes occur whenever a power terminal is held at one of two prescribed voltage levels, e.g., 10 and 20 volts, respectively, and ground potential is applied, for a predefined time approximately 10 $\mu$S, to an output terminal of the circuit. Within the calibration mode, the gain of the VGA can be incrementally and successively increased or decreased in response to transitions then occurring in the power voltage, within a predefined time of the output signal grounding, to implement full scale (slope) correction at the second ambient calibration temperature. In particular, a positive transition from, e.g., 10 to 10.5 volts incrementally increases the gain of the VGA, while a negative transition from, e.g., 10 to 9.5 volts incrementally decreases this gain. By detecting specific temporal manipulation of the voltages applied to the power and output terminals and invoking modes and specific calibration operations as a result, the inventive circuit eliminates any need for a specialized interface and associated circuitry for accessing register to impart calibration data to the circuit;thus, reducin circuit complexity and cost. Moreover, the resulting three-pin connection,i.e., power, ground and output voltage for two,if a case housing the inventive circuit is the ground connection,advantageously enables the inventive circuit to be a direct pin-for-pin replacement for the industry standard national LM-34 & –35 series equivalent sensors.

BRIEF DESCRIPTION OF THE DRAWINGS

The teachings of the present invention can be readily understood by considering the following detailed description in conjunction with the accompanying drawings, in which.

DETAILED DESCRIPTION OF THE INVENTION

In essence, my inventive temperature sensing circuit employs silicon thermometry, i.e., use of a silicon diode junction to provide a highly linear temperature dependent voltage, along with subsequent signal processing stages, either mixed-mode or digital, that collectively implement, through two-point calibration, independent adjustment of slope (span or full scale) and offset. The offset adjustment is advantageously accomplished through use of a digital tear.

Figure 1:
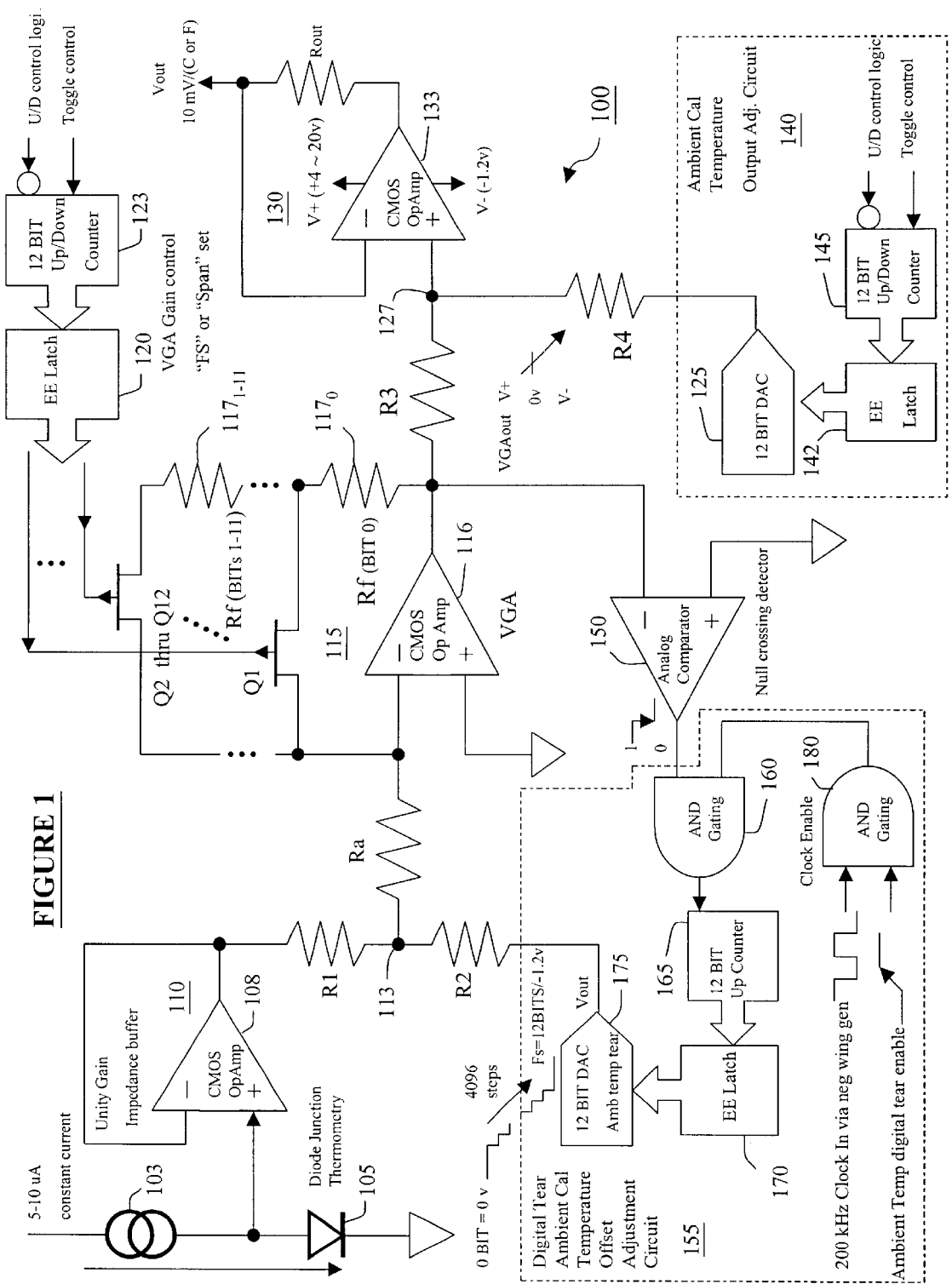
FIG. 1 depicts a high-level block diagram of a first embodiment of the present invention, specifically circuit 100 which utilizes a mixed-signal approach, which provides highly accurate and linear thermometry.
Figure 2:
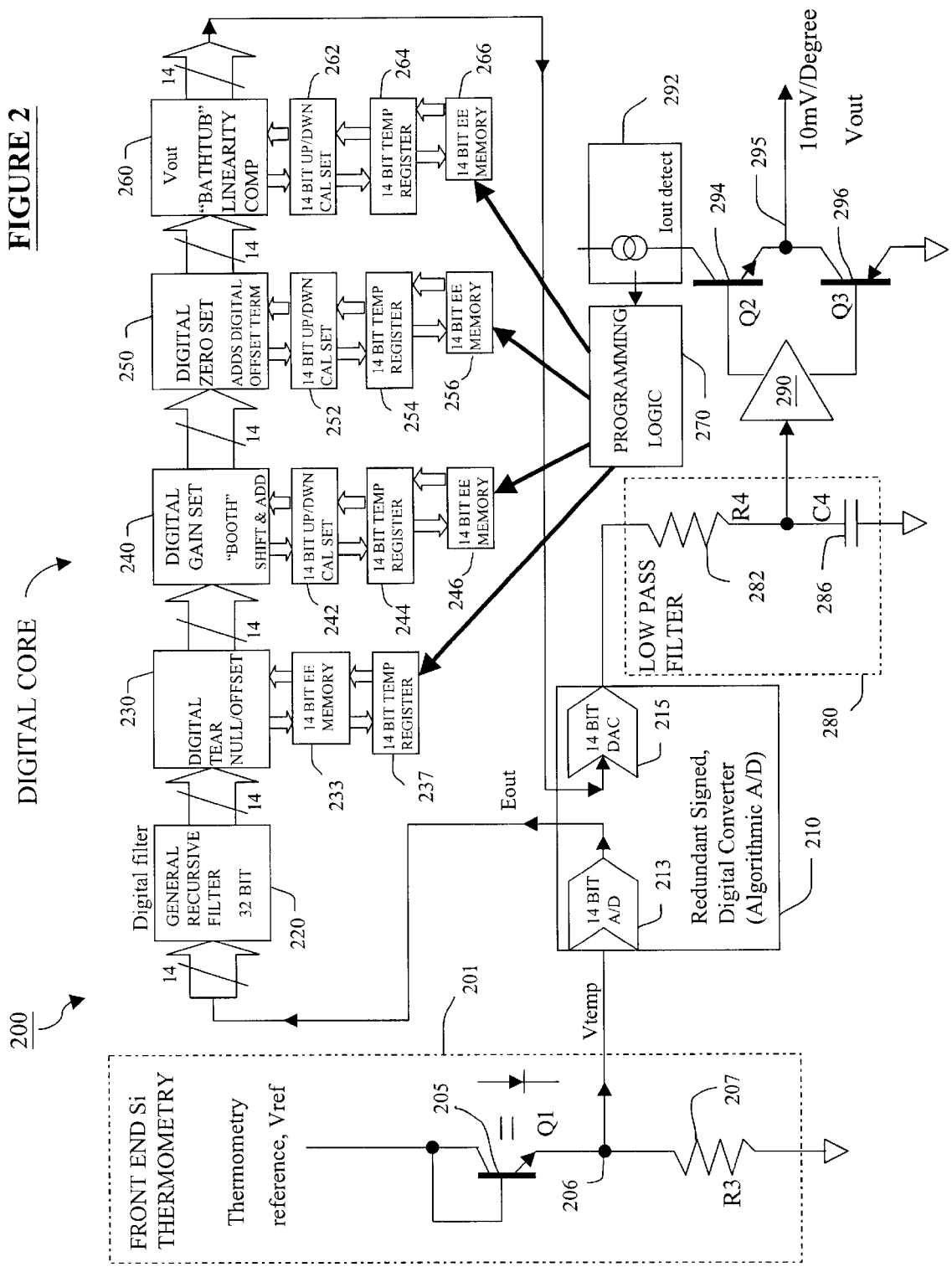
FIG. 2 depicts a high-level block diagram of a second embodiment of the present invention, specifically circuit 200 which utilizes a digital core, which also provides highly accurate and linear thermometry.

In both embodiments shown in FIGS. 1 and 2, given the inherent linearity of silicon thermometry, zero offset and desired output voltage are set, independently of each other, at one predefined ambient calibration temperature as effectively two separate offset values, while slope (span) is set at a second calibration temperature (typically a full scale temperature) different from the first temperature.

Specifically, each of the inventive circuits utilizes highly linear (e.g., on the order of ±0.05 degree C) front-end thermometry.

With respect to circuit 100 shown in FIG. 1, a very low, constant current (typically on the order of 5~10 μA) is first applied, from current source 103, through a silicon p-n diode junction (having a negative temperature coefficient on the order of 2~2.2 mV per degree C). The diode junction is typically implemented through small physical diode 105. Resulting diode junction voltage is then applied to a non-inverting input of unity gain buffer 110 implemented by CMOS (complementary metal oxide semiconductor) operational amplifier 108. Use of this buffer is necessitated by a relatively high impedance topology provided by diode 105 when it is operated at such relatively low current levels.

The output of buffer 110 is applied through resistor R1 as one input to first summing junction 113. Another input to this summing junction, though applied through resistor R2, is provided by an output, Vout, from 12-bit digital-to-analog converter (DAC) 175 contained within Digital Tear Ambient Calibration Temperature Offset Adjustment circuit 155. This circuit also contains EE (electrically erasable) latch 170, 12-bit up counter 165, and separate AND gating blocks 160 and 180. The output of converter 175 provides an equal and opposite mirror summing potential (for "nulling") to that provided by the buffer such that a true zero-volt input can be provided as an input to variable gain amplifier (VGA) 115. As such, at a reference temperature, occurring during programming mode, at which inventive circuit 100 will be "nulled", output voltage, Vout, provided by the DAC, for equal-valued resistors R1 and R2, will equal the voltage appearing at the output of buffer 110. The potential at summing junction 113 is applied through resistor Ra to an input of VGA 115 and specifically to an inverting input of CMOS operational amplifier 116 used therein. The gain of VGA 115 is digitally programmed through selection, in response to values of individual corresponding bits of a 12-bit word generated by EE latch 120 and applied to FETs (field effect transistors) Q1–Q12 (of which, for simplicity of illustration, only two such FETs are explicitly shown), of individual corresponding ones of 12 series-connected feedback resistors ($117_0$ and $117_{1-11}$, of which only two are explicitly shown, again for simplicity of illustration) collectively labeled as Rf. Through appropriate adjustment of the gain of VGA 115, a slope adjustment of the output, Vo, produced by inventive circuit 100 can be independently varied, whenever this circuit, at a first prevailing ambient calibration temperature and during a programming mode, is instructed to assume either a prevailing offset or is at a zero temperature (either of which could be, e.g., from 0 to 35 degrees C). The input to DAC 175 is a digital value stored within EE latch 170. This value can be varied during programming mode, via 12-bit up counter 165, the contents of which are supplied to an input of the latch.

Calibration mode occurs (and is initiated and controlled by conventional control circuitry not shown) whenever V+ is held at a prescribed voltage level, v, and ground potential is applied, for approximately 10 μS, to an output terminal (pin) at which output, Vout, of circuit 100 appears. During the calibration mode (via V+ at prescribed input v, and with the output pin taken to ground for approximately 10 μS), the following occurs to implement "nulling" at the first ambient calibration temperature:

1) VGA 115 is set for maximum gain through an appropriate digital value existing in EE latch 120; this value having been set within 12-bit up/down (U/D) counter 123, through appropriate U/D control logic and toggle control signals (both from well-known control circuitry not specifically shown), which feeds latch 120;

2) 12-bit up counter 165 is then enabled and gated (incremented upwards) via AND gating logic 160, in response to a system clock appearing via AND gating 180, while referencing an output of a null crossing detector (implemented through analog comparator 150); and 3) once a null ("zero") crossing is detected by comparator 150, the contents then occurring in counter 165 will subsequently be programmed into EE latch 170 while the gain of VGA 115 is set to its center value. Latch 170, as well as latch 120, is independently programmed by simultaneously setting the V+ pin to 20 v and bringing the Vout terminal, of inventive circuit 100, low (i.e., ground potential) for approximately 10 μS.

The analog output, Vout, of the inventive circuit 100 is then calibrated to generate a desired output voltage at the first ambient calibration temperature, independently of the slope, with an appropriate offset term. This occurs through use of summing junction 127 situated just prior an input of final unity gain output buffer 130, implemented through CMOS operational amplifier 133, and particularly an output of 12-bit DAC 125, contained with Ambient Calibration Temperature Output Adjustment circuit 140, applied through resistor R4 as one independent input to this summing junction. Circuit 140 also contains EE latch 162 and up/down counter 145. Within circuit 140, the input to DAC 125 is a digital value stored within latch 142; this value having been set by counter 145 through appropriate up/down control logic and toggle control signals (also from well-known control circuitry not specifically shown, though different from those applied to counter 123). As a consequence of this independent adjustment, even when the slope calibration is changed at an ambient calibration temperature, no interaction results between this ambient temperature calibration and the slope calibration, i.e., changing one will not change the other. Despite changes in the VGA gain, with zero volts presented to an input of VGA 115, the output of this VGA will always be zero, whereas the offset term (that formed at the output of DAC,125, at the ambient calibration temperature) is independently added as a positive offset summed against this zero value. Advantageously, then, both the slope (or full scale, i.e., span) and the offset, at an ambient calibration,temperature, can be set independently of each other. In that regard, the output of VGA 115 and that of DAC 125 are applied through equally-valued resistors R3 and R4 to summing junction 127 associated with final non-inverting unity gain buffer 130.

Due to the inherent highly linear thermometry front-end as previously described, there is no need for linearity correction, rather only slope correction (accomplished through programmed gain changes for VGA 115, via EE latch 120) is required. To accomplish slope correction, inventive circuit 100 is taken to some higher full scale (FS) temperature (preferably, e.g., at least 10 degrees C. higher than the ambient calibration temperature value) and the analog output at that elevated temperature is noted. For example, at 100 degrees C. with 10 mV output per degree C. desired, the output of the inventive circuit 100 should reflect 1.00 v. To calibrate this FS point, again the Vout pin of the inventive circuit is taken to ground for approximately 10 $\mu$S while the V+ pin is taken to 10 v. Then, the voltage appearing at the V+ pin steps up from 10 v to 10.5 v to increment the value up, or conversely steps down from 10 v down to 9.5 v to decrement the output value (appearing at Vout pin) down. It is during the V+ transition up or down that the Vout calibration is performed for either ambient or FS adjustment. In the case of FS adjustment, the gain (nominally 20) of amplifier 116 used within VGA 115 is itself trimmed via a 12-bit (roughly ±2000 steps) up/down trim of effective resistance values of feedback resistors Rf located within the VGA itself; hence, modifying its gain term. If either such transition does not occur within a predefined time period after the 10 $\mu$S grounding of the output voltage connection, then the control circuitry will invoke zero offset and output voltage correction at a then current, preferably first ambient calibration, temperature of the device. However, if the transition does occur in such a timely fashion, then the control circuitry will invoke slope correction instead at the ambient device temperature, which is preferably the second ambient calibration temperature.

Non-volatile, i.e., "hard", programming of EE latches 120 and 170 (rather than merely having binary values stored within volatile registers in these latches) is performed, i.e., programming mode occurs, by taking the V+ pin to 20 v (ideal programming value for EE memory, though not requiring use of a voltage doubler or like), while taking the Vout pin again low (ground) for approximately 10 $\mu$S. This condition, as well as all the other programming conditions, is detected by conventional control circuitry (not shown). Once these values are stored for both latches, circuit 100 is then considered calibrated. Advantageously, only two independent calibration points are required to calibrate inventive circuit 100 with no ensuing interaction occurring between zero and FS (or slope) All other known temperature sensing devices, including the LM-34/-35 devices, exhibit such an interaction—to some extent, and typically require a first-order laser trim on a die level. Inventive circuit 100 should demonstrate accuracies, after calibration, on the order of ±0.1 degree C which is approximately an order of magnitude better than that produced through currently available devices and clearly superior to that of a typical "B" DIN PT-100 platinum based temperature sensing device (which is a current standard).

Advantageously, calibration of inventive circuit 100 is performed through use of analog "window" comparators referenced to a band-gap reference (with regard to V+ mode, up/down toggle, and final EE program enable), with voltage at Vout pin being taken low (ground, or "0" state) for a prescribed period (approximately 10 $\mu$S). This methodology prevents so-called "glitches" (transient phenomena) from adversely affecting the calibration and provides a cost effective (through simplicity of architecture, such as not requiring a UART and/or RISC-based processor) methodology of accessing the device for calibration. It also enables a direct pin-for-pin replacement for the industry standard National LM-34 & -35 series equivalent sensors.

Furthermore, contained within inventive circuit 100 is a negative wing generator-based reference source (not specifically shown but -1.2 v ratiometric to an internal band-gap reference of diode 105) for the operational amplifiers. This source allows voltage appearing at the Vout pin of the inventive circuit to decrease below -550 mV (equals -55 degrees C or F, depending on the configuration of the inventive device)—a capability which is not possible via a bipolar complementary output stage presently employed by commercially available silicon temperature transducers, such as, e.g., the LM-34/-35. To provide such a capability, these conventional transducers would require that a negative bias current and the output voltage, produced by the transducer, be applied, via appropriate resistors, to a summing junction of an external impedance buffering unity gain amplifier; hence, disadvantageously incurring added complexity and cost.

Now, turning to the embodiment shown in FIG. 2. By virtue of substituting digital for mixed-signal processing, the resulting circuit, when integrated into an application specific integrated circuit (ASIC), consumes less area (surface geometry) on a silicon die and hence incurs lower production cost than mixed-signal circuit 100 shown in FIG. 1. Advantageously, both embodiments provide highly linear thermometry, and require only a two point (two temperature) calibration to realize a usable dynamic range of -72 to +150 degrees C. Accordingly, both embodiments, i.e., circuits 100 and 200, provide increased reliability, high accuracy/resolution and field re-adjustment—capabilities not heretofore possible with conventional industry standard laser-trimmed silicon temperature transducers. Inasmuch as various aspects of the operation, including general aspects of calibration, of circuit 200 are identical to those for circuit 100, for the sake of brevity I will omit discussing those aspects and will focus on the differences.

As shown in FIG. 2, front end silicon (Si) thermometry portion 201 utilizes a forward biased diode junction (base-emitter) of transistor (Q1) 205 in series, at its emitter connection, with resistor (R) 207. This transistor (though shown as being bipolar can alternatively be a MOSFET—metal oxide semiconductor field effect transistor—device) is supplied, at its collector, by thermometry reference voltage, Vref. The value of this resistor is selected such that a time constant, associated with this resistor in conjunction with capacitance of the diode junction, corrects for small linearity corrections, hence yielding a nearly linear (±0.05 to ±0.1 degree C.) voltage at point 206 over a temperature range of -72 to +150 degrees C. As such, the resulting linearity of circuit 200 is nearly ideal.

Redundant, signed "algorithmic" analog-to-digital (A/D) converter 210 provides A/D conversion, through its internal 14-bit A/D converter 213 of a temperature-dependent voltage, Vtemp, appearing at point 206, and also, through its time-shared internal 14-bit digital-to-analog (D/A) converter (DAC) 215 (internally time-shared between implementing the A/D and D/A functionality), provides a linear VDC output. The linear VDC output voltage produced by DAC 215 is filtered through low pass R-C filter 280, formed of resistor 282 (R4) and capacitor 286 (C4), with their respective resistance and capacitance values being chosen to provide an appropriate degree of noise filtering and signal smoothing. A resulting filtered output signal is supplied as input to complementary output amplifier 290 which, in turn, drives bipolar complementary output transistors 294 and 296 with a final output voltage, Vout (10 mV/degree C or F depending on configuration), being taken on lead 295 connected between both transistors. The reference for the A/D is a micro-power band-gap diode (1.2 v) (not shown).

A resulting 14-bit digitized value, Eout, produced by A/D converter 213 is applied through "General Recursive" Digital filter 220 to limit its bandwidth and enhance its resolution (up to 32-bits), thereby assuring a reliable and stable bit stream at throughputs of up to a 10 kilohertz rate.

A "digital tear" occurs (in response to a Vout terminal (pin) on an ASIC that implements circuit 200 being taken low for 20 $\mu$S, and is detected and controlled by conventional control circuitry not shown) while circuit 200 is being calibrated at a first desired and predefined ambient (e.g., 0–30 degrees C) temperature (i.e., a "first calibration" temperature). Digital Tear Null/Offset stage 230 loads a prevailing bit value supplied by digital filter 220 to 14-bit register 237. What results is an output of 0 (zero with no sign) bits, since this tear value (formed by a counter within stage 230 but not specifically shown) is subtracted from a real-time output of the digital filter from this time forward. At this juncture, this tear value is simply stored in a volatile register, specifically register 237; however, this value will subsequently be written into EE memory 233—but only after calibration has been completed. This value is not written into EE memory during calibration for the simple reason that doing so would likely induce self heating which would effect a temperature rise in an ASIC implementation of circuit 200, hence possibly negating an accurate calibration. The counter within stage 230, register 237 and memory 233 effectively form a digital equivalent to digital tear ambient temperature offset adjustment circuit 155 shown in FIG. 1.

Digital Gain Set stage 240, shown in FIG. 2, corrects slope and/or normalizes a transfer function of the highly linear thermometry to 10 mV per degree (C or F, as determined during calibration). Stage 240 provides this function by employing a "Booth" adder, which is a well-known shift and add (or subtract) methodology. Stage 240 functions over a full 14 bits, hence providing 14 bits of adjustment which yields better than 2 millidegree C of certainty at a slope calibration reference temperature. At this point in the calibration of circuit 200, the circuit is normalized for a transfer function of unity (one).

A resulting zero bit value is routed to an input of Digital Zero Set stage 250. When the Vout pin on the ASIC is taken low for 105 $\mu$S, this action (again through conventional control circuitry not shown) prompts 14-bit up/down counter 252 (labeled as CAL SET counter) to respond to positive and negative edges of clock pulses imposed upon the V+ pin (not specifically shown) of circuit 200. This counter increments up or down corresponding to either positive or negative edge transitions on the V+ pin. For an ambient of 25 degrees C as an example, counter 252 would be incremented "UP" until a corresponding +250 mV was realized at the Vout pin. The contents of the counter would then be stored within 14-bit register 254 (which is volatile) until that value is subsequently written into EE memory 256. This value is not written into EE memory 256 during calibration so as not to adversely affect calibration through self-induced heating (as noted above). Counter 252, register 254 and memory 256 effectively form a digital equivalent to ambient calibration temperature output adjustment circuit 140 shown in FIG. 1.

To complete calibration for circuit 200 shown in FIG. 2, the ASIC is then stabilized at a higher "second calibration" temperature (e.g., 50, 70, 100 or 150 degrees C.—though these values are not critical). The "digital gain set" is selected by taking the Vout pin of the ASIC low for approximately 65 $\mu$S. This methodology of positive and negative edges imposed on the V+ DC power pin (nominal 8.75V is required for logic in the control circuitry to enter calibration mode, with transitions up to 12V in increments of +1 bit, and transitions down to 5 v from nominal 8.75 v in increments of −1 bit) will increment the gain term up or down as required to achieve a trimmed output. For a calibration temperature of 85 degrees C, the gain is adjusted to achieve an output of +850 mV. Through this methodology and due to the digital tear technique employed, circuit 200 will have effectively learned its calibration. An optional stage, specifically state 260 which implements a conventional "bathtub" curve, can be provided, as shown, to eliminate small variations that can occur in manufacture of matched transistors 294 and 296 that collectively form a complementary output stage. Stage 260 operates in the same overall fashion as does stages 240 and 250. Through application of an appropriate corresponding temporal voltage protocol, similar to that described above, i.e., holding the Vout pin low for a corresponding amount of time and properly varying the DC value on the V+ pin, the contents of each of registers 244, 254 and 264 can be adjusted accordingly during calibration. Hence, stages 240, 250 and 260 will not be discussed in any further detail here.

While calibration is progressing, all calibration values are held in volatile (temporary) registers 237, 244 and 254, and, where stage 260 is used, in register 264, as well. After calibration concludes, as noted above, these values are written, by programming logic 270, into corresponding EE memories 233, 246, 256 and 266. To do so, the DC voltage at the V+ pin of the ASIC is set at 8.75V and the Vout pin is taken low for approximately 145 $\mu$S. In response to this, conventional control circuitry (not shown but contained within programming logic 270), operative in response to Iout detector 292 which detects output current flow, causes circuit 200 to load the values from the temporary memory registers into corresponding EE memory. During this operation, the voltage on the V+ pin is ramped up to the EE programming voltage of 12V at a prescribed rate of 28 mV/$\mu$S as to not damage the EE registers which have 100 year retention. Thereafter, i.e., once these values are so written, the device is deemed calibrated, but any of these parameters may be changed independently, if desired.

To simplify the foregoing discussion and the drawings, specific clock, state machine and other control circuits have not been shown and described. However, all these circuits, which would be incorporated within both of the embodiments of the present invention, are conventional and their constituent nature readily apparent to anyone skilled in the art.

While the digital core in circuit 200 has been shown and described as constituting discrete digital stages, the core could alternatively be implemented using an appropriate microprocessor or similar digital device programmed, either by software and/or firmware, to provide the same collective functionality as all of these stages, including independent slope, full scale and offset adjustment. Doing so may provide enhanced flexibility but possibly at an expense of increased component cost, circuit size and/or design complexity.

Although two different embodiments, each of which incorporates the teachings of the present invention, have been shown and described in detail herein, those skilled in the art can readily devise many other embodiments, modifications and applications of the present invention that still utilize these teachings.

I claim:

1. Apparatus for producing an output voltage proportional to a temperature, the apparatus comprising:
   a temperature sensing device for sensing ambient temperature through use of a silicon junction and for producing a temperature dependent signal responsive to the ambient temperature;
   signal processing circuitry, connected to the temperature sensing device, for producing the output voltage in response to the temperature dependent signal; and
   calibration circuitry, connected to the signal processing circuitry, for implementing a two-point temperature calibration so as to provide, at a first calibration temperature, adjustment of offset and magnitude of the output voltage to be produced at the first calibration temperature, and, at a second calibration temperature different from the first calibration temperature, adjustment of slope of the output voltage, the calibration circuitry comprising:
      temperature offset calibration circuitry for determining, at the first calibration temperature, a zero offset value and storing the zero offset value for subsequent use, and subsequently applying the zero offset value to a first input of the signal processing circuitry as a zero offset correction value;
      output adjustment circuitry for determining, at the first calibration temperature, an output offset value such that the output voltage equals a first predefined value and storing the output offset value for subsequent use, and subsequently applying the output offset value to a second input of the signal processing circuitry as a output voltage offset correction value; and
      gain adjustment circuitry for providing a digital value for varying a gain of the signal processing circuitry so that, at the second calibration temperature, the gain is capable of being set to a value where the output voltage equals a second predefined value and storing the digital value for subsequent use, and subsequently applying the digital value to a third input of the signal processing circuitry to set the gain of the signal processing circuitry;
      wherein the temperature offset calibration circuitry, the output adjustment circuitry and the gain adjustment circuitry all function independently of each other.

2. The apparatus in claim 1 wherein the temperature offset calibration circuitry determines the zero offset value through a digital tear.

3. The apparatus in claim 2 wherein each of the temperature offset calibration circuitry, the output adjustment circuitry and the gain adjustment circuitry comprises a separate memory for storing, in a non-volatile fashion, a corresponding one of the zero offset value, the output offset value and the digital value.

4. The apparatus in claim 3 wherein the silicon junction is provided through a diode, a bipolar transistor or a field-effect transistor.

5. The apparatus in claim 4 wherein the apparatus further comprises control circuitry, connected to the output adjustment circuitry and the gain adjustment circuitry, for detecting first predefined levels of a power signal applied to the apparatus and the output voltage in order to independently instruct the output adjustment circuitry or the gain adjustment circuitry to selectively vary, on an incremental basis, the output offset value or the digital value, respectively, during calibration of the apparatus.

6. The apparatus in claim 5 wherein the predefined transitions in the output voltage comprise grounding of the output voltage for a predefined amount of time.

7. The apparatus in claim 6 wherein the control circuitry further detects predefined transitions in the power signal and grounding of the output voltage so as to incrementally vary the digital value associated with the gain adjustment circuitry.

8. The apparatus in claim 7 wherein the control circuitry further detects second predefined levels of both the power signal applied to the apparatus and the output voltage for instructing the memory in each of the temperature offset calibration circuitry, the output adjustment circuitry and the gain adjustment circuitry to store, in the non-volatile fashion, the zero offset value, the output offset value and the digital value, respectively.

9. The apparatus in claim 8 wherein the signal processing circuitry comprises:
   a variable gain amplifier (VGA) responsive, through the first input, to both the temperature-dependent signal and the zero offset value, for producing an amplified signal, wherein the VGA is also responsive, through the third input, to the gain adjustment circuitry to set a gain of the VGA through use of the digital value;
   a zero crossing detector, responsive to the amplified signal and connected to the temperature offset calibration circuitry, for controlling the temperature offset calibration circuitry to produce the zero offset value through the digital tear such that the zero offset value is determined by a value of the digital tear that occurs when the amplified signal crosses zero; and
   an output amplifier for producing the output voltage in response, through the second input, to the amplified signal and the output offset value.

10. The apparatus in claim 9 wherein each of the temperature offset calibration circuitry, the output adjustment circuitry and the gain adjustment circuitry comprises:
    a counter connected to the control circuitry for counting input pulses selectively applied to the counter so as to controllably increment contents of the counter; and
    a non-volatile memory connected to the counter for storing the contents of the counter.

11. The apparatus in claim 8 wherein the signal processing circuitry comprises:
    an analog-to-digital converter for converting the temperature dependent signal into a digital temperature signal;
    a digital filter, responsive to the digital temperature signal for producing a filtered digital temperature signal;
    first, second and third serially connected digital processing stages, responsive to the filtered digital temperature signal and providing the first, second and third inputs, respectively, for successively implementing the temperature offset calibration circuitry, the output adjustment circuitry and the gain adjustment circuitry, respectively, and for producing a digital output signal;
    analog output circuitry, responsive to the digital output signal, for producing the output signal.

12. The apparatus in claim 11 wherein each of the temperature offset calibration circuitry, the output adjustment circuitry and the gain adjustment circuitry comprises:
- a counter connected to the control circuitry for counting input pulses selectively applied to the counter so as to controllably increment contents of the counter; and
- a non-volatile memory connected to the counter for storing the contents of the counter.

13. The apparatus in claim 12 wherein the second digital processing stage implements gain adjustment through a "Booth" adder.

14. The apparatus in claim 13 wherein the analog output circuitry comprises:
- a digital-to-analog converter responsive to the digital output signal to produce a converted signal;
- a low pass filter, responsive to the converted signal, for producing a filtered analog signal; and
- an output amplifier, responsive to the filtered analog signal, for producing the output signal.

* * * * *